United States Patent [19]

Marescalchi

[11] Patent Number: 5,002,103

[45] Date of Patent: Mar. 26, 1991

[54] APPARATUS FOR ADJUSTING THE VOLUME OF DIPPABLE HOLLOW PUNCH DOSING DEVICES

[75] Inventor: Marco Marescalchi, Ozzano dell'Emilia, Italy

[73] Assignee: Nuova Zanasi S.p.A., Italy

[21] Appl. No.: 396,334

[22] Filed: Aug. 21, 1989

[30] Foreign Application Priority Data

Sep. 22, 1988 [IT] Italy .................. 12551 A/88

[51] Int. Cl.⁵ .............................. B65B 1/16
[52] U.S. Cl. ..................... 141/266; 141/71; 141/73; 141/67
[58] Field of Search .............. 141/71, 81, 73, 266, 141/249, 93, 67

[56] References Cited

U.S. PATENT DOCUMENTS

| | | | |
|---|---|---|---|
| 2,815,046 | 12/1957 | McBean et al. | 141/93 |
| 3,219,416 | 11/1965 | Natelson | 141/67 |
| 3,587,671 | 6/1971 | Gamberini | 141/67 |
| 3,656,517 | 4/1972 | Taylor et al. | 141/67 |
| 3,656,518 | 4/1972 | Aronson | 141/81 |
| 3,847,191 | 11/1974 | Aronson | 141/67 |
| 4,062,386 | 12/1977 | Zanasi | 141/258 |
| 4,116,247 | 9/1978 | Zanasi | 141/81 |
| 4,542,835 | 9/1985 | Gamberini | 141/71 |

Primary Examiner—Ernest G. Cusick
Attorney, Agent, or Firm—Larson and Taylor

[57] ABSTRACT

A movable abutment plate (28) which is bound by common vertical guide to a vertical axis, an axially hollow turntable (9) carrying two sets of vertical dosing devices (V1, V2) and a central cap-shaped screw (29) secured to the top end of bar (33) are provided. Bar (33) passes through the turntable (9) and turret (1), such that the bar extends into the lower part of the dosing machine, where the bar (33) includes a crown gear (36) with suitably shaped peripheral apertures (37) arranged in an equispaced relation. When turntable (9) is lowered, one of the apertures (37) in crown gear (36) engages with a crankpin (41) which is fitted on the slowly rotating shaft of geared motor (43) controlled by encoder (44). When the volume of dosing devices (V1, V2) needs adjustment, turntable (9) is temporarily lowered and geared motor (43) is actuated to thereby lift or lower plate (28), against which bear the lateral appendices (25) of the moving elements of the dosing devices (V1, V2). The actuation of geared motor (43) is automatic or semi-automatic, and is interlocked with a mechanism for controlling the weight of the material doses contained in, or discharged from, the dosing devices into suitable containers, such as capsules, bottles, or the like.

8 Claims, 6 Drawing Sheets

APPARATUS FOR ADJUSTING THE VOLUME OF DIPPABLE HOLLOW PUNCH DOSING DEVICES

SUMMARY OF THE INVENTION

The invention relates to an apparatus for automatically or semi-automatically adjusting the volume of dippable hollow punch volumetrically dosing devices in a machine for a volumetric dosing of powder or particle materials.

This dosing machine is a reciprocatingly operated automatic machine which is provided with at least two sets of dippable hollow punch volumetrically dosing devices arranged vertically at 180° from each other on an axially hollow, vertical axis turntable which upon control is lowered and lifted, and which is alternatingly rotated over 180° in both senses of the direction of rotation, when the said turnable is in its raised position. Under the two sets of dippable hollow punch volumetrically dosing devices, in opposite locations at 180° from each other, are the station for dosing a particle or powder material contained in an underlying supply magazine, and the station for discharging the particle or powder material doses into suitable containers such as capsules, bottles, or the like.

By having the turntable lifted and rotated over 180° in the one and the contrary direction, the two sets of dippable hollow punch volumetrically dosing devices are alternatingly moved, when in their raised position, into the particle or powder material dosing station and into the station for discharging the particle or powder material doses.

By having the turntable lowered the dippable hollow punch volumetrically dosing devices of the one or the other set located in the dosing station, will be lowered down and dipped into an underlying supply magazine containing a particle or powder material to be dosed. Thus, the dosing device hollow punch volumetrically dosing cavities, which are each delimited at the top by a respective piston, are each filled with a desired dose of particle or powder material. Simultaneously, the dosing devices of the one or the other set also brought into their down position in the discharge station by the lowered turntable, will have their moving elements acted upon by suitable pushers, whereby the particle or powder material doses will be discharged from each of their dosing device hollow punches into respective suitable containers.

Therefore, while the downwardly positioned volumetrically dosing devices of the one set, located in the dosing station, are carrying out the step of picking up particle or powder material doses by means of their dippable hollow punches, the downwardly positioned dosing devices of the other set, located in the discharge station, will be at the same time subjected to the step of discharging the desired particle or powder material doses from their hollow punches into respective suitable containers.

When the material to be handled is a compactible powder material, this material is held by friction into the usable volume of the dosing device hollow punches. Whereas, when a particle material is to be handled, such as, for example, a pharmaceutical compound, whereby a time-delayed effect can be produced by the medicament contained therein, air suction lines are provided in the dosing machine which open each into the top of the respective hollow puch volumetrically dosing cavity, to hold thereinto an incoherent material dose.

Thanks to the apparatus according to the invention, provided in a dosing machine of the above disclosed type for automatically or semi-automatically adjusting the quantity of a particle or powder material volumetrically measured out by the dosing device hollow punches, the weight of the material doses will be maintained within predetermined limits that are controlled and managed by weighing and automation means of known type. Peculiar features of the apparatus according to the invention, are its simple construction, its high reliability from the technical viewpoint, and also that this apparatus does not entail any appreciable increase in bulk of the external members of the dosing machine.

BRIEF DESCRIPTION OF THE DRAWINGS

These and other features of the dosing machine provided with the apparatus according to the invention, and the advantages arising therefrom will be stated more in detail in the following description of two preferred embodiments of same, which are shown by way of non-limiting examples in the Figures of the two annexed sheets of drawing, in which.

DESCRIPTION OF THE PREFERRED EMBODIMENTS

Figure 1:
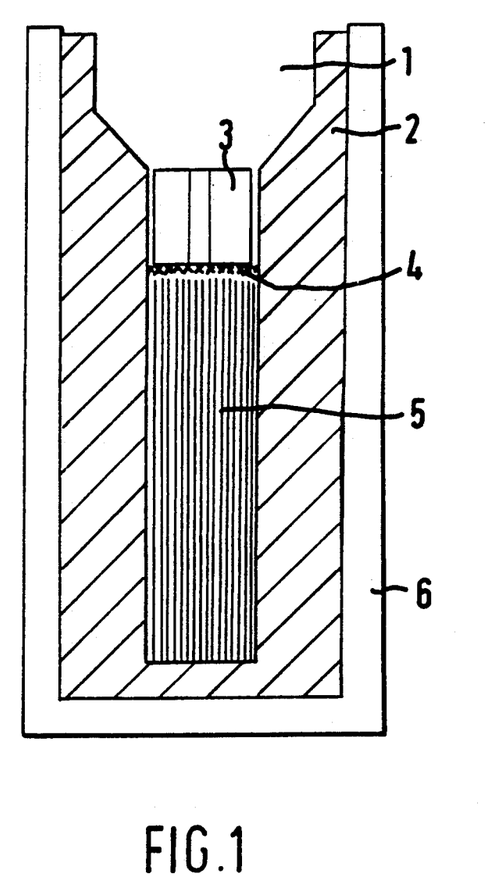
FIGS. 1 and 2 are longitudinally sectioned views of a first embodiment of a volumetrically dosing machine, respectively showing the upper part and the lower part of the dosing machine, which is provided with the apparatus according to the invention, and is particularly adapted for handling particle materials.
Figures 2, 3, 4:
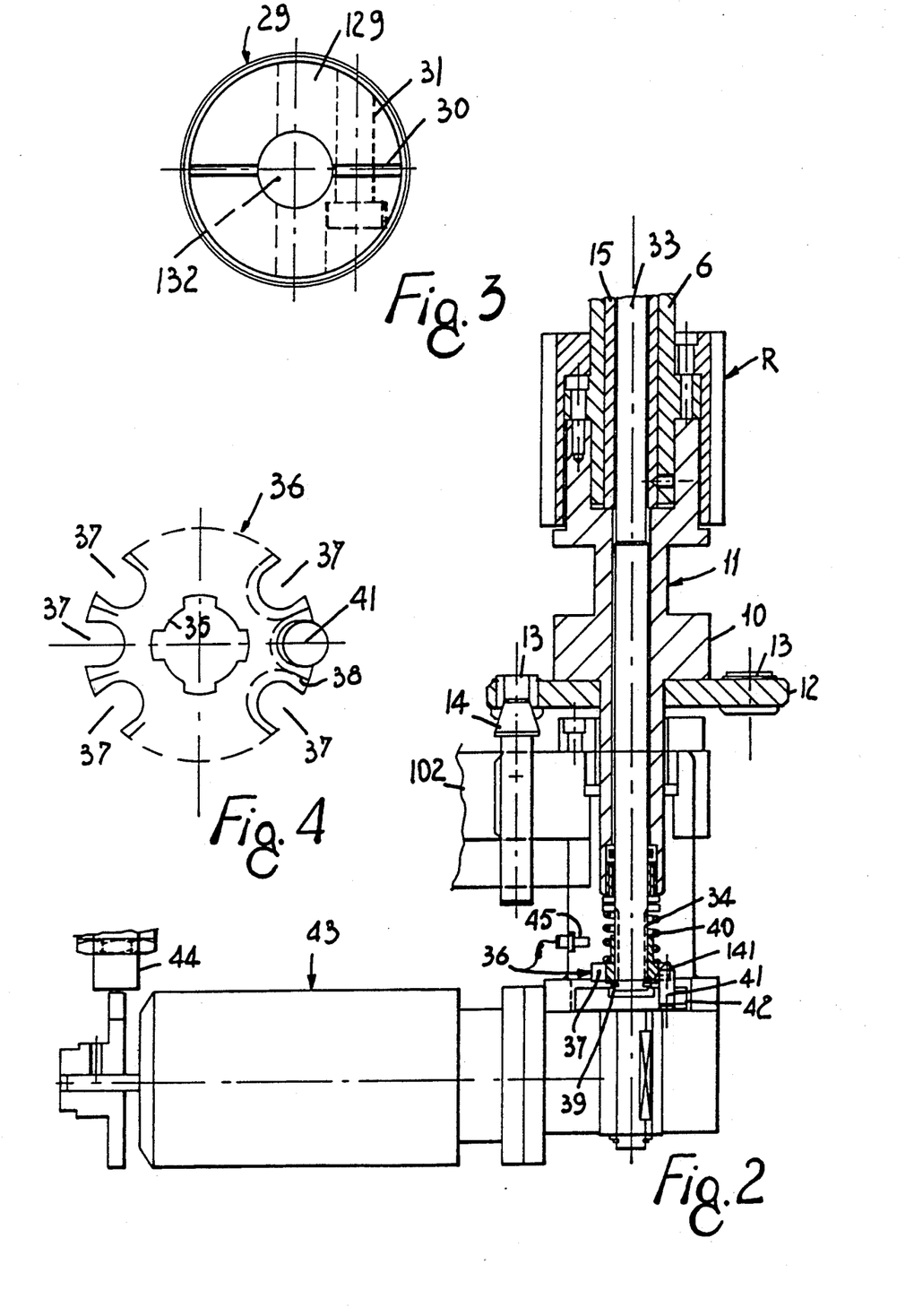
FIG. 3 is a top view of a clamp-like locked screw, which is used in the apparatus according to the invention.
FIG. 4 is a top view showing the particular crown gear which is provided in the lower part of the volumetrically dosing machine, and is to be kinematically connected with the serve control for adjusting the volume of the dippable hollow punch volumetrically dosing devices of the dosing machine.

Shown in FIGS. 1 and 2 is a volumetrically dosing machine, which is particularly adapted for handling particle materials. This dosing machine comprises a turret 1 which is fixedly fitted on a turret-supported frame 2. In turret 1 which is axially hollow, a tubular rod 6 is rotatably and axially displaceably supported by means of bushings 3 and 4, with bushing 4 being held by a support 5 secured to frame 2. By means of a key 7, an also axially hollow turntable 9 is keyed onto the top end of said tubular rod 6, and is fixed in position by a ring nut 8. The said turntable 9 carries two sets of dippable hollow punch volumetrically dosing devices V1, V2 which are vertically arranged and are angularly equispaced by 180°, with their hollow punches being directed downwardly. The tubular rod 6 extends downward from the underside of frame 2 (FIG. 2) and a sprocket R is keyed onto the lower end of rod 6, and is in mesh with a driving wheel (not shown) which is reciprocatingly rotated over 180°, so that the turntable 9, when in its raised position, can be alternatingly rotated over 180° in both senses of the direction of rotation, and the two sets V1, V2 of dosing devices carried by the said turntable 9, will be thus moved into the dosing station and into the discharge station.

Also axially secured to the lower end of tubular rod 6 is a body 10 extending substantially from the bottom thereof and formed with an annular groove 11 for cooperation with a not shown lever known per se, which upon control alternatingly moves the tubular rod 6 up and down by a proper amount, such that the turntable 9 can be suitably lifted, to bring the volumetrically dosing devices of the one or the other set V1 or V2 into the dosing or the discharge station, and the said turntable 9 can be suitably lowered down to have the desired particle material doses picked up by the hollow punches of one set, for example V1, of the dosing devices, and at the same time to have the particle material doses discharged from each hollow punch of the other set, for example V2. A disc 10 is co-axially secured to that side of body 10 which is turned away from groove 11, and is provided with seats 13 which are angularly moved by turns into contact with a conical obturator 14 borne by a fixed frame 102.

Fitted into the tubular rod 6 is a stationary, co-axial, tubular rod 15 which is held in position by body 10 (FIG. 2). Between the said tubular rods 6 and 15 an annular gap 16 is formed, having such a longitudinal extent that the suction lines 17 for applying a suction to the hollow punches of the volumetrically dosing devices V1, V2 on turntable 9, so as to hold a required quantity of particle material into the said hollow punches, can be connected with two diametrically opposite bores 18 and 19, respectively in the top and bottom ends of tubular rod 6.

The bottom bores 19 open into an annularly recessed portion 20 provided in turret 1, which through duct 21 is normally set in communication with a vacuum source. With the tubular rod 6 in its uplifted position, the two bores 19 are both under suction so that suction can be applied to the dosing device hollow punches of the one and the other set V1,V2 which in their raised postion are alternatingly moved into the dosing station and into the discharge station. When the tubular rod 6 is in its lowered down position, the bore 19 which is on the side of the discharge station, is closed by an intercepting means 22, so that the particle material doses can be discharged from each of the dosing device hollow punches into suitable respective containers. The opposite bore 19 is still under suction, the suction being however attenuated by a choking means 23.

In the dosing station, the downwardly positioned volumetrically dosing devices of one set V1 or V2 are dipped each into an underlying supply magazine 24 containing a particle material to be dosed, and suction is applied to the particle material volumetrically measured out by the hollow punches of the dosing devices, the hold the dosed particle material into their hollow punches.

In the discharge station lying opposite to magazine 24, not shown pushers will simultaneously act in timed relation upon the moving elements of the downwardly positioned dosing devices of one set V2 or V1 holding a desired particle material dose in each of their hollow punches, to bring down these elements, and to discharge the particle material doses from each of the dosing device hollow punches into not shown respective suitable containers.

The moving element of each volumetrically dosing device is urged upwardly by a spring 26, and is provided with an appendix 25 which through a longitudinal slot laterally protrudes from the respective dosing device body.

When the volumetrically dosing devices of one set V1 or V2 having been moved into the station for discharge of the particle material doses, are still in their raised position, the moving elements of said dosing devices are not yet affected by the pushers acting in the discharge station, and the appendices 25 will bear against respective ledges 27 which are held in a finely adjustable mode by a horizontal plate 28. With the aid of not shown vertical guide means, the plate 28 is supported by turntable 9, and by a screw/nut screw adjusting means the said plate 28 can be lifted and lowered so as to have the level of said plate 28, and so the volume of the dosing device hollow punches adjusted as desired.

In some embodiments, instead of only one plate, two such plates are provided for adjusting the volume of the dosing device hollow punches, and each plate is fitted with its own means for guiding and adjusting same. However, in the present state of the art, the dosing machine has to be stopped, and the plate-adjusting means have to be manually operated, whenever it is required to adjust the level of the one plate or of the two plates, and so the volume of the dosing device hollow punches.

In order to obviate the above mentioned drawback, the invention provides an improved apparatus for automatically or semi-automatically adjusting the volume of the dosing device hollow punches.

The apparatus according to the invention, associated with a machine for a volumetric dosing of powder or particle materials, is characterized by the provision of only one plate 28, which is bound to the dosing device turntable 9 by not shown vertical guide means. The plate 28 has a threaded central bore into which is screwed a cap-shaped screw 29 having an upward hollow extension 129 with a transversal cut 30 therein (FIG. 3), whereby the said screw 29 can be clamp-like locked by means of a screw 31 threaded and tightened in the said cut, on the spigot 132 of a nut screw 32 which with the aid of pins, and/or any like means, is attached to the top end of a bar 33, and is centrally fitted into the said threaded central bore in plate 28. The bar 33 is rotatably passed from above into and through the tubular rod 15 fitted into the tubular rod 6, and through the body 10, and the said bar 33 extends downwardly from body 10 by a section formed with longitudinal grooves 34, in which a crown gear 36 is capable to slide thanks to its mating ribs 35 (FIG. 4).

The crown gear 36 is carried on the bottom end of bar 33 and is peripherally formed with equispaced apertures 37 having each a downwardly beveled edge 38, and each aperture 37 is diametrically opposite to an equal aperture 37. The said crown gear 36 bears on an elastic ring 39 fitted on the bottom end of bar 33, and by a spring 40 threaded on the downwardly extending lower end section of bar 33, the crown gear 36 is held against the said ring 39.

Whenever the turntable equipment with the sets V1, V2 of volumetrically dosing devices has been lowered down by the tubular rod 6, one of the peripheral apertures 37 in crown gear 36 is caused to come into engagement with a round crank pin 41 arranged parallel to the axis of bar 33, and formed with a pointed upper end 141 which is intended for cooperating with the downwardly beveled edge 38 of one of said apertures 37. The crankpin 41 is secured to crank 42 keyed onto the slowly rotating shaft of geared motor 43, and this shaft is parallel to crankpin 41. An encoder 44 is mounted on the quickly rotating shaft of geared motor 43.

The operation of the apparatus for automatically or semi-automatically adjusting the volume of the hollow punch volumetric dosing devices, according to the invention, is simple and apparent.

When the dosing devices V1, V2 are in their raised position, the crown gear 36 does not cooperate with crankpin 41. Therefore, the dosing devices of the one or the other set V1 or V2 can be angularly moved by 180° from the station for dosing of a particle material into the station for discharge of the desired particle material doses. When the dosing devices V1, V2 have been lowered down and brought into their down position, one of the apertures 37 in crown gear 36 is caused to come into engagement with crankpin 41 which is held stationary if no volume adjustment of the dosing device hollow punches is required.

However, when the volume of the dosing device hollow punches needs to be adjusted, the dosing device turntable 9 will be temporaneously kept in its lowered down position, and the bar 33 will be entrained in rotation in the one or the contrary direction by the coupling 41-36 driven by the actuated geared motor 43, so that the cap-shaped screw 29 will be thus turned in the one or the contrary direction by the proper amount as required for the desired lifting or lowering of plate 28 to the level corresponding to the required volume of the dosing device hollow punches. Encoder 44 controls the amount of upward or downward shiftment of said plate 28, induced by geared motor 43.

Once the volume of the dosing device hollow punches has been adjusted, the working cycle of the dosing machine will be restarted. When the dosing devices V1, V2 are nextly lowered down, the aperture 37 in crown gear 36, which on completion of such an adjustment was disengaged from crankpin 41, or the diametrically opposite aperture 37 in the crown gear 36, makes a close fit with crankpin 41.

Thanks to the particular shape of crankpin 41 and apertures 37, the crown gear 36 and crankpin 41 will be coupled with each other in a steady and reliable mode. However, if such a coupling of crown gear 36 and crankpin 41 should fail to occur, the crown gear 36 would slide with its mating ribs 35 in the longitudinal grooves 34 formed in the downwardly extending lower end section of bar 33, against the load of spring 40, and abut against a sensor 45. Thus, the sensor 45 will detect such irregular condition of crown gear 36 and crankpin 41 and will emit a control signal to stop the dosing machine, and to to display the said irregular condition.

To have the volumetrically dosing devices properly set up, without affecting the kinematic chain with the cap-shaped screw 29 at its upper end, the clamping screw 31 will be unloosened and manually turned, independently from the nut screw and spigot 32-132, and from bar 33, whereby the level of plate 28 will be adjusted as required.

The geared motor 43 may be automatically controlled by an electronic processor, or the same may be manually actuated by an operator, anyway under the control of known means for detecting, for example in a statistical manner, the weight of the particle material doses contained in the dosing device hollow punches, or discharged from their hollow punches into respective suitable containers, and for comparing the weight of the particle or powder material doses with one or more predermined values.

Figures 4, 5:
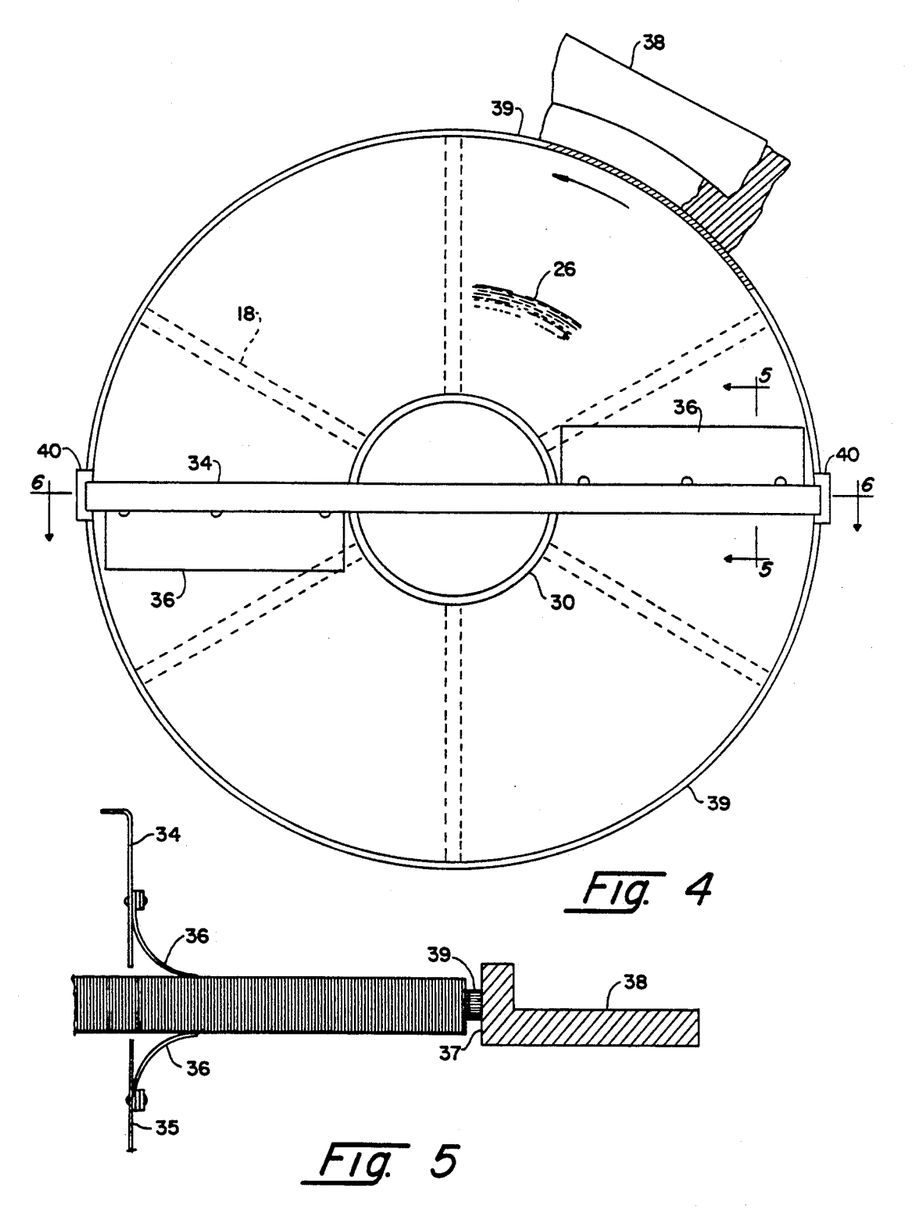
FIG. 5 is a vertical sectional view of the upper part of a second embodiment of a volumetrically dosing machine provided with the apparatus according to the invention, in its version which is adapted for handling compactible powders.
Figure 5:
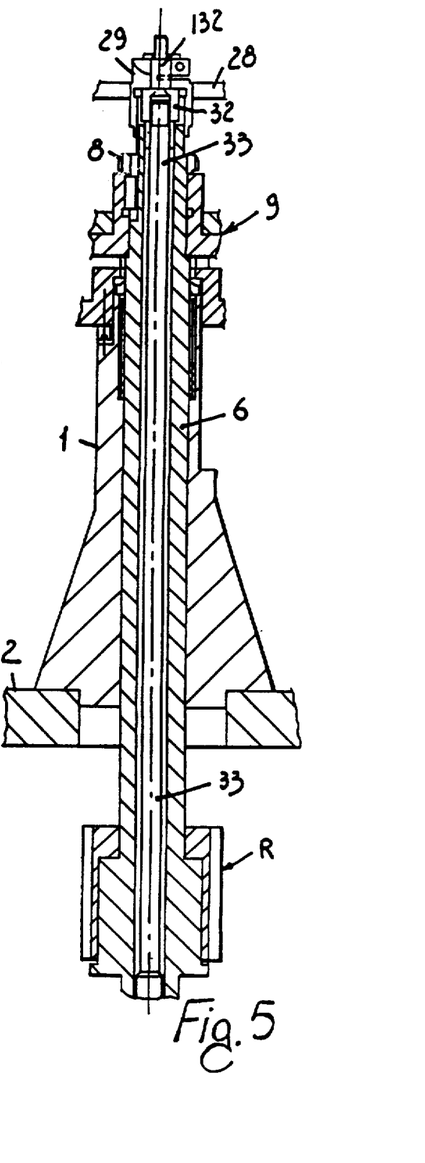
Figure 6:
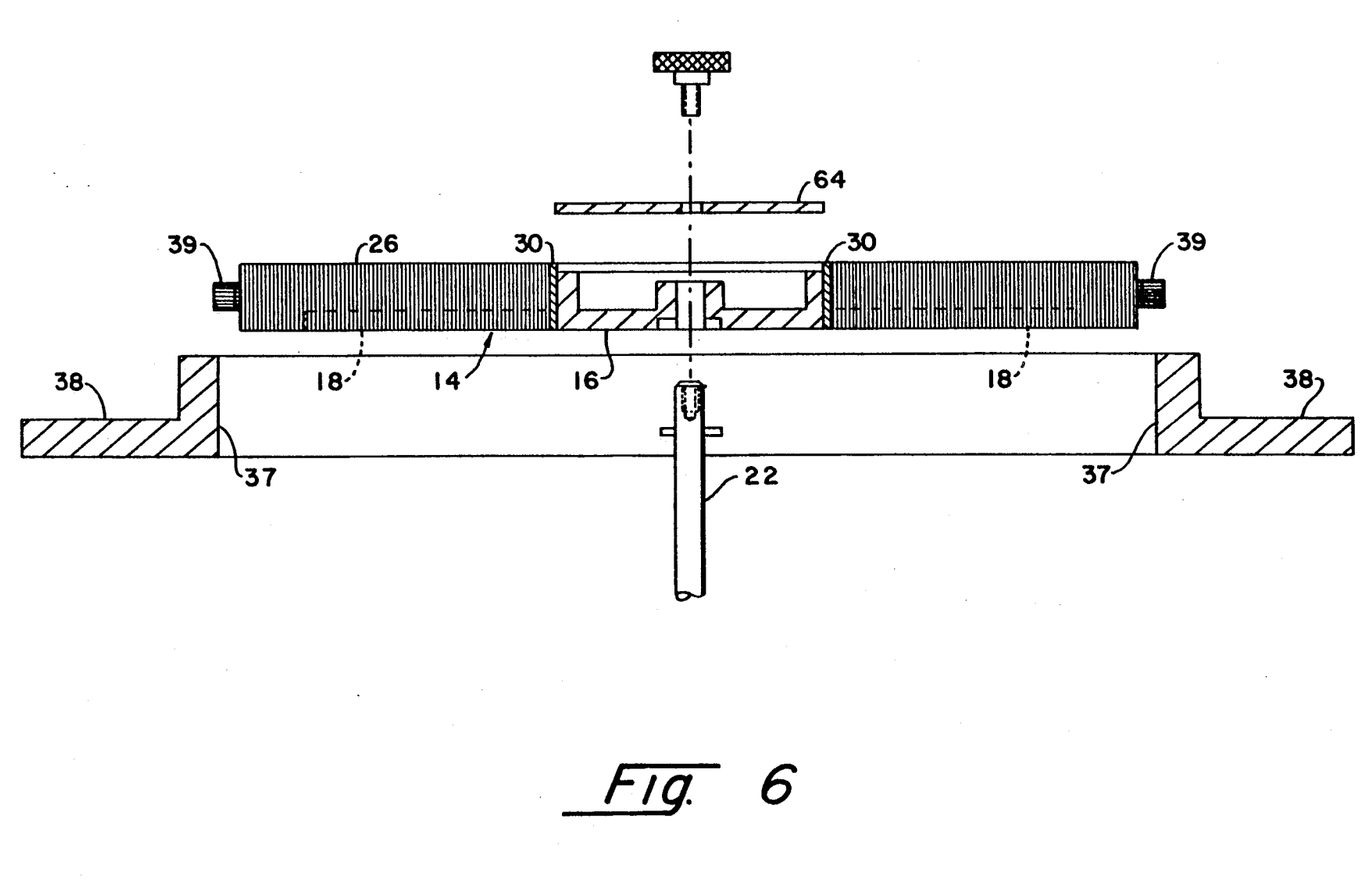
Figure 7:
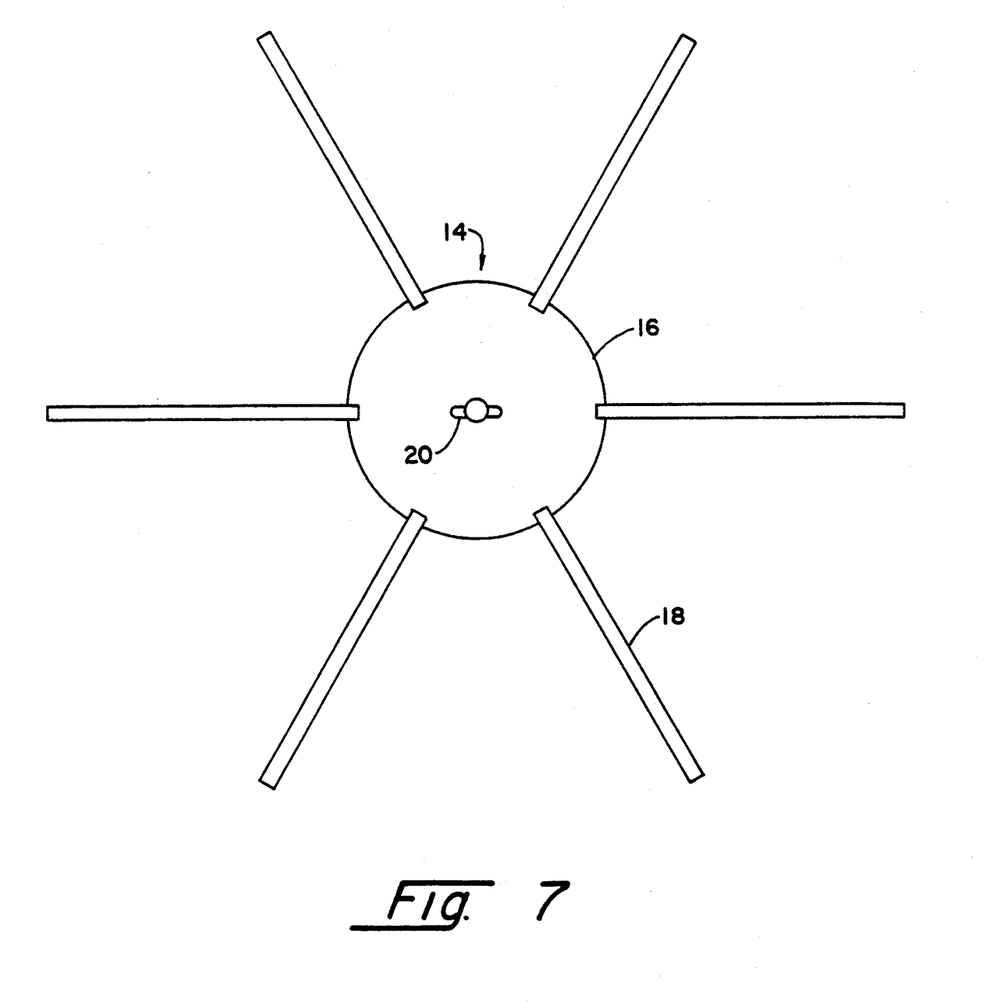
Figure 8:
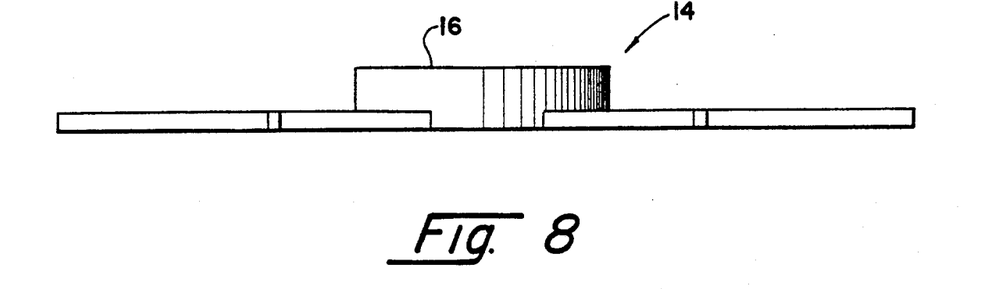
Figure 9:
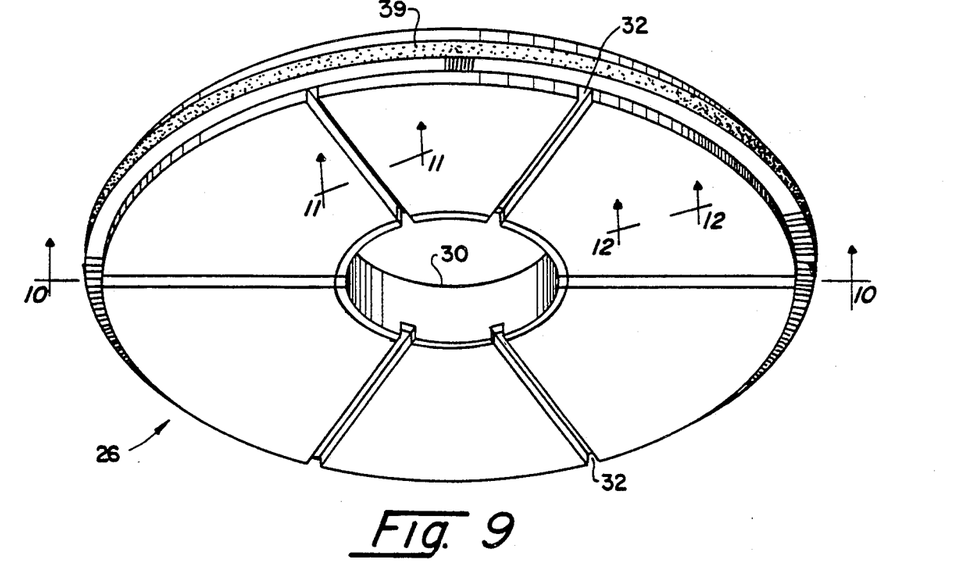
Figure 10:
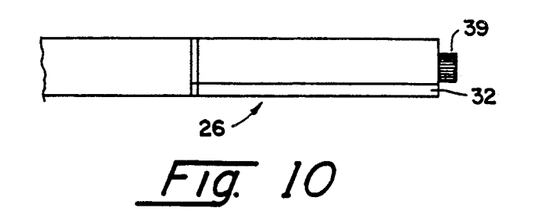

FIG. 5 shows a second embodiment of the dosing machine, in its version which is applicable when the volumetrically dosing devices are intended for handling compactible powders which are held by friction into the dosing device hollow punches. In this case, it is therefore unnecessary to apply a suction to the dosing device hollow punches.

The only difference between this second embodiment of the dosing machine according to the invention, and the above disclosed first embodiment for handling particle material, as shown in FIGS. 1 and 2, is that the tubular rod 15 is not required here, since no annular gap 16 needs to be formed between said tubular rod 15 and the tubular rod 6 for conveying a suction to the dosing device hollow punches, so that the bar 33 is directly fitted into the tubular rod 6.

An important advantage afforded by the volumetrically dosing machine according to the invention, is that the geared motor 43, the encoder 44, and the coupling 36-41 are all located under the turret-supporting frame 2, so that an extra floor space is not occupied.

I claim:

1. An apparatus for adjusting the volume of dippable hollow punch volumetrically dosing devices in a reciprocatingly operated automatic machine for a volumetric dosing of particle or powder materials, said apparatus having at least first and second sets of dippable hollow punch volumetrically dosing devices arranged vertically on an axially hollow, vertical axis turntable which is movable between a lowered position and a raised position, and is rotatable when in said raised position, said turntable being supported by a tubular rod which is rotatably and axially displaceably supported by means of bushings in a turret fixedly fitted on a turret-supporting frame, with said bushing supported by a support secured to said frame, and wherein the top end of said rod is keyed by means of a key to said turntable, such that by alternating lifting and rotating said turntable said first set is alternatingly moved between a dosing station and a discharge station while said second set is simultaneously alternatingly moved between said discharge station and said dosing station, said dosing devices each further comprising a dosing device hollow punch and a lateral appendix which protrudes from the top end of each of said dosing devices, and cooperates with a plate connected to said turntable, the level of said plate being adjustable to correspondingly adjust the volume of said dosing device hollow punches, said plate which is caused to cooperate with a cap-shaped screw being secured to the top end of a bar which co-axially and rotatably passes through said tubular rod, and extends downwardly from a body fitted on the lower end of said tubular rod, by a lower end section formed with longitudinal grooves, with a first member of a coupling being carried on the bottom end of said downwardly extending lower end section of said bar, and with a second member of said coupling being fitted on a geared motor controlled by an encoder.

2. The apparatus according to claim 1, characterized in that said cap-shaped screw which is caused to cooperate with plate for determining the level of said plate, and hence the volume of the dosing device hollow punches adjusted as desired, screws into a threaded central bore in said plate, and said screw is secured to said top end of said bar by a nut screw, which is centrally fitted into said threaded bore in said plate and is attached to said top end of said bar by a screw threaded and tightened in a transversal cut provided in an upward hollow extension of said cap-shaped screw, on a spigot of said nut screw.

3. The apparatus according to claim 1, wherein the bottom of said bar carrying said cap-shaped screw is connected to said geared motor through said coupling, and wherein said coupling comprises a mechanical front coupling.

4. The apparatus according to claim 1, wherein said first member of said coupling is a crown gear carried on the bottom end of said downwardly extending lower end section of said bar formed with longitudinal grooves, and is peripherally formed with equispaced, diametrically opposite, equal apertures, each further comprising a downwardly beveled edge, said crown gear being slidable along said grooves and biased against an elastic ring fitted on said bottom end of said bar by a spring threaded on said downwardly extending lower end section of bar, and wherein said second member of said coupling further comprises a round crankpin secured to a crank keyed onto said geared motor arranged parallel to the axis of said bar, and formed with a pointed upper end which cooperates with said downwardly beveled edge of one of said peripheral apertures in said crown gear such that said crown gear engages said crankpin when said turntable is in said lowered position.

5. The apparatus according to claim 1, wherein to provide a volume adjustment of said dosing device hollow punches, while said turntable is in said lowered position, said bar rotates with said coupling driven by said gear motor such that said cap-shaped screw truns to thereby move said plate to a level corresponding to a desired volume of said dosing device hollow punches, with said encoder controlling the movement of said plate (28), said geared motor interlocked with means for detecting and controlling the weight of said doses contained in said dosing device hollow punches and for comparing the weight of said doses with one or more predetermined values.

6. The apparatus according to claim 1, wherein upon the condition that said crown gear and said crankpin fail to engage while said dosing device turntable is in said lowered position, said crown gear slides with mating ribs in longitudinal grooves formed in said downwardly extending lower end section of said bar, against the load of said spring, and abuts a sensor, said sensor being provided for detecting said condition and for emitting a control signal in accordance therewith.

7. The apparatus according to claim 1, characterized in that said bar carrying said cap-shaped screw fits into said tubular rod with the interposition of a co-axial stationary tubular rod forming an annular gap, whereby suction lines provide suction to said hollow punches to therein hold a required quantity of said dosing material in said hollow punches, and said bar connects with two diametrically opposite bores provided in the top and bottom ends respectively of said tubular rod, with said bottom bore opening into an annularly recessed portion provided in said turret, which through a duct, connects with a vacuum source.

8. The apparatus according to claim 1, characterized in that said bar fits into said tubular rod, and forms an annular gap for providing suction to said dosing device hollow punches.

* * * * *

UNITED STATES PATENT AND TRADEMARK OFFICE
CERTIFICATE OF CORRECTION

PATENT NO. : 5,002,103                  Page 1 of 3

DATED : March 26, 1991

INVENTOR(S) : Marco Marescalchi

It is certified that error appears in the above-identified patent and that said Letters Patent is hereby corrected as shown below:

The title page showing the illustrative figure should be deleted to appear as per attached title page.

Sheet 1 of the drawings, consisting of Fig. 1, should be deleted to be replaced with the Sheet 1 of the drawings, consisting of Figs. 1 and 5, as shown on the attached sheet.

Sheets 3, 4, 5 and 6, consisting of Figs. 4, 5, 6, 7, 8, 9, 10, 11 and 12, should be deleted. (Leaving corrected Sheet 1 (Figs. 1 and 5), and correct Sheet 2 (Figs. 2, 3 and 4), in the printed patent.)

Signed and Sealed this

Thirteenth Day of August, 1991

*Attest:*

HARRY F. MANBECK, JR.

*Attesting Officer*            *Commissioner of Patents and Trademarks*

United States Patent [19]

Marescalchi

[11] Patent Number: 5,002,103
[45] Date of Patent: Mar. 26, 1991

[54] APPARATUS FOR ADJUSTING THE VOLUME OF DIPPABLE HOLLOW PUNCH DOSING DEVICES

[75] Inventor: Marco Marescalchi, Ozzano dell'Emilia, Italy

[73] Assignee: Nuova Zanasi S.p.A., Italy

[21] Appl. No.: 396,334

[22] Filed: Aug. 21, 1989

[30] Foreign Application Priority Data

Sep. 22, 1988 [IT] Italy ................................ 12551 A/88

[51] Int. Cl.⁵ .............................................. B65B 1/16
[52] U.S. Cl. ...................... 141/266; 141/71; 141/73; 141/67
[58] Field of Search .................. 141/71, 81, 73, 266, 141/249, 93, 67

[56] References Cited

U.S. PATENT DOCUMENTS

| | | | |
|---|---|---|---|
| 2,815,046 | 12/1957 | McBean et al. | 141/93 |
| 3,219,416 | 11/1965 | Natelson | 141/67 |
| 3,587,671 | 6/1971 | Gamberini | 141/67 |
| 3,656,517 | 4/1972 | Taylor et al. | 141/67 |
| 3,656,518 | 4/1972 | Aronson | 141/81 |
| 3,847,191 | 11/1974 | Aronson | 141/67 |
| 4,062,386 | 12/1977 | Zanasi | 141/258 |
| 4,116,247 | 9/1978 | Zanasi | 141/81 |
| 4,542,835 | 9/1985 | Gamberini | 141/71 |

Primary Examiner—Ernest G. Cusick
Attorney, Agent, or Firm—Larson and Taylor

[57] ABSTRACT

A movable abutment plate (28) which is bound by common vertical guide to a vertical axis, an axially hollow turntable (9) carrying two sets of vertical dosing devices (V1, V2) and a central cap-shaped screw (29) secured to the top end of bar (33) are provided. Bar (33) passes through the turntable (9) and turret (1), such that the bar extends into the lower part of the dosing machine, where the bar (33) includes a crown gear (36) with suitably shaped peripheral apertures (37) arranged in an equispaced relation. When turntable (9) is lowered, one of the apertures (37) in crown gear (36) engages with a crankpin (41) which is fitted on the slowly rotating shaft of geared motor (43) controlled by encoder (44). When the volume of dosing devices (V1, V2) needs adjustment, turntable (9) is temporarily lowered and geared motor (43) is actuated to thereby lift or lower plate (28), against which bear the lateral appendices (25) of the moving elements of the dosing devices (V1, V2). The actuation of geared motor (43) is automatic or semi-automatic, and is interlocked with a mechanism for controlling the weight of the material doses contained in, or discharged from, the dosing devices into suitable containers, such as capsules, bottles, or the like.

8 Claims, 2 Drawing Sheets

Fig.1
Fig.5